US011034596B2

(12) United States Patent
Kaminski et al.

(10) Patent No.: US 11,034,596 B2
(45) Date of Patent: Jun. 15, 2021

(54) METHODS TO SEPARATE BRINE FROM INVERT EMULSIONS USED IN DRILLING AND COMPLETION FLUIDS

(71) Applicant: Sinomine Resources (US) Inc., Wilmington, DE (US)

(72) Inventors: Lauren J. Kaminski, Aberdeen (GB); Siv K. Howard, Milltimber (GB); Ravi Sharma, Acton, MA (US); Lukasz Grzybek, Aberdeen (GB)

(73) Assignee: SINOMINE RESOURCES (US) INC., Wilmington, DE (US)

( * ) Notice: Subject to any disclaimer, the term of this patent is extended or adjusted under 35 U.S.C. 154(b) by 1638 days.

(21) Appl. No.: 14/549,936

(22) Filed: Nov. 21, 2014

(65) Prior Publication Data

US 2015/0144565 A1 May 28, 2015

Related U.S. Application Data

(60) Provisional application No. 61/945,303, filed on Feb. 27, 2014, provisional application No. 61/909,754, filed on Nov. 27, 2013.

(51) Int. Cl.
| | |
|---|---|
| *C02F 1/04* | (2006.01) |
| *C02F 1/28* | (2006.01) |
| *C02F 1/66* | (2006.01) |
| *B01D 17/02* | (2006.01) |
| *B01D 17/04* | (2006.01) |
| *C02F 101/32* | (2006.01) |
| *C02F 103/10* | (2006.01) |
| *C02F 1/00* | (2006.01) |
| *C09K 8/36* | (2006.01) |

(52) U.S. Cl.
CPC .......... *C02F 1/283* (2013.01); *B01D 17/0202* (2013.01); *B01D 17/047* (2013.01); *C02F 1/66* (2013.01); *C02F 2001/007* (2013.01); *C02F 2101/32* (2013.01); *C02F 2103/10* (2013.01); *C09K 8/36* (2013.01)

(58) Field of Classification Search
CPC .... B01D 17/0202; B01D 17/047; C09K 8/03; C02F 2101/32
See application file for complete search history.

(56) References Cited

U.S. PATENT DOCUMENTS

| | | | | |
|---|---|---|---|---|
| 3,580,844 A | * | 5/1971 | Fratzscher et al. ... | C10M 175/04 210/665 |
| 3,767,571 A | * | 10/1973 | Lorenc ............... | B01D 17/0202 210/671 |
| 3,885,628 A | * | 5/1975 | Reed ..................... | C09K 8/584 166/252.1 |
| 3,928,194 A | | 12/1975 | Tao | |
| 4,366,063 A | * | 12/1982 | O'Connor ............. | B01D 17/02 166/267 |
| 4,381,241 A | * | 4/1983 | Romenesko ........ | B01F 17/0071 507/127 |
| 4,440,548 A | * | 4/1984 | Hill ...................... | B01D 53/047 95/100 |
| 4,713,183 A | * | 12/1987 | Patel ........................ | C09K 8/32 507/128 |
| 4,836,302 A | * | 6/1989 | Heilhecker .......... | B01D 11/028 175/66 |
| 5,346,537 A | * | 9/1994 | Lowell ............... | B01D 53/1425 95/161 |
| 5,401,404 A | * | 3/1995 | Strauss .............. | B01D 17/0208 210/265 |
| 5,614,100 A | * | 3/1997 | Gallup ............... | B01D 17/0202 210/665 |
| 5,677,267 A | * | 10/1997 | Suarez ................. | C09K 8/5045 507/203 |
| 6,153,017 A | * | 11/2000 | Ward ...................... | C10G 1/00 134/10 |
| 6,177,014 B1 | * | 1/2001 | Potter .................... | B01D 61/14 210/651 |
| 6,214,236 B1 | * | 4/2001 | Scalliet .............. | B01D 17/0211 210/708 |
| 6,352,644 B1 | * | 3/2002 | Hawthorne .............. | B09C 1/02 210/633 |
| 6,409,924 B1 | * | 6/2002 | Johnson ............. | B01D 17/0202 210/691 |
| 6,790,811 B2 | * | 9/2004 | Patel ........................ | C09K 8/32 507/129 |
| 6,818,595 B2 | | 11/2004 | Benton et al. | |

(Continued)

FOREIGN PATENT DOCUMENTS

| | | | | | |
|---|---|---|---|---|---|
| GB | | 2329655 A | * | 3/1999 | ............... C09K 8/24 |
| GB | | 2346140 A | * | 8/2000 | ............ C02F 1/4672 |

(Continued)

OTHER PUBLICATIONS

Okiel et al., Treatment of oil-water emulsions by adsorption onto activated carbon, bentonite, and deposited carbon, Oct. 2011, Egyptian Journal of Petroleum, vol. 20, pp. 9-15.*

Nemer et al., Brine-in-Crude-Oil emulsions at the Strategic Petroleum Reserve, Oct. 2013, pp. 1-72 (Year: 2013).*

Hirasaki et al., Separation of Produced Emulsions from Surfactant Enhanced Oil Recovery Processes, Energy Fuel 2011, vol. 25, pp. 555-561 (Year: 2011).*

International Search Report and Written Opinion issued in corresponding International Patent Application No. PCT/US2014/066773 dated Jun. 15, 2015 (16 pages).

(Continued)

*Primary Examiner* — Chester T Barry
(74) *Attorney, Agent, or Firm* — Kilyk & Bowersox, P.L.L.C.

(57) ABSTRACT

Methods to separate or recover brine that is present in an invert emulsion are described. The brine is present as an internal phase in the invert emulsion. The brine can be a valuable component, such as an alkali metal formate, and separation and recovering of the brine from the invert emulsion permits the brine to be reused.

54 Claims, No Drawings

(56) References Cited

U.S. PATENT DOCUMENTS

| | | | | |
|---|---|---|---|---|
| 7,429,625 B2* | 9/2008 | Harrington | C08J 3/03 | 524/376 |
| 7,556,739 B1* | 7/2009 | Johnston-Dhuet | C02F 1/28 | 210/664 |
| 7,972,512 B2* | 7/2011 | Conner | C02F 3/1273 | 210/615 |
| 8,344,179 B2* | 1/2013 | Horton | E21B 21/068 | 562/607 |
| 8,356,678 B2* | 1/2013 | Perez-Cordova | C09K 3/32 | 175/66 |
| 8,640,774 B1* | 2/2014 | Frederick | C09K 8/62 | 166/305.1 |
| 8,653,148 B2* | 2/2014 | Cha | C10G 45/02 | 516/194 |
| 9,868,890 B2* | 1/2018 | Alleman | C09K 8/52 | |
| 10,808,183 B2* | 10/2020 | Schabron | C10G 25/003 | |
| 2002/0117457 A1 | 8/2002 | Benton et al. | | |
| 2003/0034308 A1* | 2/2003 | Uefuji | C02F 11/004 | 210/663 |
| 2004/0023817 A1* | 2/2004 | Taylor | C09K 8/64 | 507/200 |
| 2004/0094483 A1* | 5/2004 | Mueller | B01D 17/02 | 210/708 |
| 2004/0147404 A1 | 7/2004 | Thaemlitz et al. | | |
| 2004/0209781 A1* | 10/2004 | Harris | B01D 21/0012 | 507/200 |
| 2005/0236015 A1* | 10/2005 | Goel | E21B 21/066 | 134/10 |
| 2007/0056611 A1* | 3/2007 | Martin | B03B 9/02 | 134/42 |
| 2007/0261848 A1 | 11/2007 | Benton | | |
| 2008/0135302 A1 | 6/2008 | Zhang et al. | | |
| 2008/0164067 A1* | 7/2008 | Tehrani | E21B 21/068 | 175/66 |
| 2008/0194436 A1* | 8/2008 | Patel | C09K 8/26 | 507/246 |
| 2009/0223871 A1* | 9/2009 | Trost | C10G 1/00 | 208/425 |
| 2011/0220418 A1* | 9/2011 | Clark | E21B 21/068 | 175/66 |
| 2011/0257328 A1* | 10/2011 | Debord | B01D 17/047 | 524/555 |
| 2011/0309001 A1 | 12/2011 | Soane et al. | | |
| 2012/0055852 A1* | 3/2012 | Soane | B09C 1/002 | 209/2 |
| 2012/0214714 A1* | 8/2012 | Whitwell | C09K 8/68 | 507/222 |
| 2013/0098615 A1* | 4/2013 | Perez | C09K 8/032 | 166/297 |
| 2013/0164801 A1* | 6/2013 | Kang | C12P 7/62 | 435/135 |
| 2014/0051620 A1* | 2/2014 | Soane | C09K 8/36 | 508/471 |
| 2014/0076635 A1* | 3/2014 | Aston | C09K 8/34 | 175/64 |
| 2014/0077417 A1* | 3/2014 | Fifield | B29C 31/041 | 264/401 |
| 2014/0138160 A1 | 5/2014 | Howard et al. | | |
| 2014/0371113 A1* | 12/2014 | Fout | E21B 21/066 | 507/117 |
| 2015/0027701 A1* | 1/2015 | Panamarathupalayam | C09K 8/36 | 166/278 |
| 2015/0144565 A1* | 5/2015 | Kaminski | C02F 1/283 | 210/664 |
| 2015/0225655 A1* | 8/2015 | Adams | C10G 25/003 | 516/138 |
| 2015/0376964 A1* | 12/2015 | Pomerleau | E21B 4/02 | 175/69 |
| 2017/0240930 A1* | 8/2017 | Roesch | B01D 21/262 | |
| 2017/0247959 A1* | 8/2017 | Dirksen | E21B 41/0078 | |
| 2017/0362528 A1* | 12/2017 | Soane | C10M 129/08 | |

FOREIGN PATENT DOCUMENTS

| | | | | |
|---|---|---|---|---|
| GB | 2346140 A | 8/2000 | | |
| GB | 2489764 A | 10/2012 | | |
| GB | WO 2012/136981 A2 * | 10/2012 | | B01J 20/20 |
| WO | 2013009744 A1 | 1/2013 | | |

OTHER PUBLICATIONS

Communication Relating to the Results of the Partial International Search issued in corresponding International Patent Application No. PCT/US2014/066773 dated Feb. 27, 2015 (6 pages).

Taugbol, et al., "The Completion of Subsea Production Wells Eased by the Use of a Unique, High-Density, Solids-Free, Oil Based Completion Fluid", IADC/SPE Drilling Conference, 87126, Dallas, Texas, Mar. 2-4, 2004.

Office Action/Communication pursuant to Article 94(3) EPC received in corresponding European Patent Application No. 14 821 337.4 dated Dec. 5, 2017 (5 pages).

EPO Official Communication pursuant to Article 94(3) EPC received in corresponding European Patent Application No. 14 821 337.4 dated Mar. 8, 2018 (4 pages).

* cited by examiner

METHODS TO SEPARATE BRINE FROM INVERT EMULSIONS USED IN DRILLING AND COMPLETION FLUIDS

This application claims the benefit under 35 U.S.C. § 119(e) of prior U.S. Provisional Patent Application No. 61/909,754, filed Nov. 27, 2013, and U.S. Provisional Patent Application No. 61/945,303, filed Feb. 27, 2014, which are incorporated in their entirety by reference herein.

BACKGROUND OF THE INVENTION

The present invention relates to methods to separate or recover brine from invert emulsions. More specifically, in a preferred use, the present invention relates to separating brines, such as alkali metal formate brines, that are present in an invert emulsion, where the invert emulsion is used, for instance, in drilling and/or completion operations for hydrocarbon recovery efforts.

During the operation of rotary drilling wells for the extraction of gas and/or oil, a drilling fluid or mud is used to provide lubrication and cooling to the drill bit and to remove cuttings from the bottom of the hole to the surface. This drilling fluid also controls subsurface pressures and isolates migrating fluids from the formation by providing enough hydrostatic pressure, etc. The drilling fluid or mud is pumped down the rotating drill pipe, through the bit and up the annular space between the formation or steel casing and the rotating pipe to the surface.

Oil-based muds are common in the drilling industry and generally contain particulate solids and/or other liquid components in a hydrocarbon or other oil fluid. Oil-based drilling muds generally contain functional additives used to improve drilling operations in several ways. These fluids are circulated through and around the drill bit to lubricate and cool the bit, provide suspension to help support the weight of the drill pipe and casing, coat the well bore surface to prevent caving in and weight to balance against undesirable fluid flow from the formation, and/or to carry drill cuttings away from the bit to the surface. The oil-based drilling fluids can be oil-continuous compositions that may also contain a water solution (e.g. brine such as calcium chloride brine or an alkali metal brine) as a discontinuous phase (making the fluids water-in-oil invert emulsions). The oil-based fluids can also contain one or more emulsifiers to stabilize the invert emulsion, surfactants, rheology modifying agents (e.g. oleophilic clays), wetting agents, weighting agents (e.g. barium sulfate or hematite), fluid loss control agents (e.g. lignins), and/or other additives (e.g. lime). Oil-based muds can be considered water-in-oil macroemulsions, which are also called invert emulsions. The oil used in the oil-based fluids can be or include diesel, mineral oils, synthetic oils, unsaturated olefins, organic esters, any mixtures thereof, or other oils. Used oil-based drilling muds generally contain, in addition to the above components, drill cuttings and/or other dissolved or dispersed materials derived from the drilled medium or from other sources of contamination such as process and environmental waters.

In drilling an oil or gas well, the use of hydrocarbon-based drilling fluids are greatly preferred because of the inherent advantages of having an external phase fluid in contact with the formation. However, one severe disadvantage to a hydrocarbon-based drilling fluid is that weighting materials, such as barite, calcium carbonate, or hematite must be added to increase the density of the fluid. These weighting-material solids are capable of inducing formation damage to producing formations. However, hydrocarbon-based drilling fluids that have low solids content in the drilling fluid in order to avoid the above-mentioned disadvantages were developed and contain high density salt brines, such as cesium formate, potassium formate or mixtures thereof.

As indicated, in drilling operations, such as the drilling that occurs in oil field operations, drilling fluids are designed/formulated to serve several functions. These functions include acting as a lubricant to the drill bit to reduce wear and friction during drilling and also to seal the formation surface by forming a filter cake. Currently, in the industry, both oil-based muds (OBMs) and water based muds (WBMs) are typically used. More commonly, synthetic based muds (SBMs) are also used in drilling operations. In the drilling fluid, agents for lubrication are present as well as weighting materials in order to achieve a density that typically produces a pressure greater than the surrounding pressure in the well bore. Furthermore, the drilling fluid will also contain a sealing or fluid loss agent, such as calcium carbonate for pore bridging especially polysaccharides and other polymers, in order to form the filter cake on the formation surface of the well bore. In addition, when the drilling fluids are used during drilling, the drilling fluid also contains drilling fines, such as shale and sandstone fines. During the drilling operations and afterwards, the filter cake seals the formation surface of the well bore so that the well bore can be completely formed without any leakage from the formation surface into the well bore and/or without any leakage of the drilling fluids into the formation surface. While the filter cake is beneficial for these reasons, once the drilling is completed, and the recovery of hydrocarbons is the next step, the filter cake can act as a severe impediment to the recovery of hydrocarbons. For instance, the filter cake can prevent the recovery of hydrocarbons from the formation surfaces which have been blocked or sealed by the filter cake. Furthermore, when injectors are used to retain reservoir pressures, the injection of sea water, for instance, can be significantly reduced due to the filter cake preventing the sea water from entering the formation and hence restricting the flow of water into the reservoir. Accordingly, the industry prefers to remove the filter cake from the well bore in order to optimize productivity. If the filter cake is not removed, the filter cake can block the pores that are part of the formation surface of the well bore which will interfere with the recovery of hydrocarbons. In many drilling operations, the drilling fluid can contain up to 5% by weight of a pore bridging material such as calcium carbonate. Calcium carbonate ($CaCO_3$) is typically a blend of particle sizes with a particle size distribution designed to optimize the bridging of the pores found in the formation. The pore size distribution of the formation is determined from its permeability, preferably by direct porosity and permeability measurements of core plugs extracted from the reservoir.

Once drilling operations have been completed, the well is prepared for the completion operations whereby the mud used for drilling is often displaced by a completion fluid. Completion fluids can be water based fluids or oil-based fluids and are generally formulated to the same density as the mud used to drill the well in order to retain the hydraulic pressure on the well bore. There are numerous methods of completing a well, amongst which are open hole completions and gravel packed screened systems. The completion fluid, when an oil-based mud, can have the same or similar ingredients to the drilling fluid, as mentioned above. The fluids are typically halide based brines such as calcium bromide, calcium chloride, and zinc bromide; or organic based brines such as the formate based fluids.

Once the invert emulsion is used, this used invert emulsion is difficult to reuse in its used condition and contains, in at least some instances, valuable brine, such as cesium salt. However, it has proved difficult to separate the valuable brine from the oil continuous phase so that the brine can be reused and the oil continuous phase can be reused or disposed of. Accordingly, there is a need in the industry to provide techniques to separate the brine and/or other aqueous phase components from the invert emulsion and then optionally reuse these one or more recovered components.

SUMMARY OF THE PRESENT INVENTION

A feature of the present invention is to provide methods to separate, recover, and/or restore brine from invert emulsions having a continuous oil phase.

A further feature of the present invention is to separate, recover, and/or restore alkali metal formates from an invert emulsion having a continuous oil phase.

A further feature of the present invention is to provide a method to recover brine in invert emulsions and to form new drilling fluids, completion fluids, or invert emulsions (in general) that contain the recovered brine.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method to separate a brine that is present in an invert emulsion having a continuous oil phase. The method can involve or include combining the invert emulsion, an aqueous liquid, and at least one adsorbent together, in any order, to obtain a diluted liquid with the adsorbent. The at least one adsorbent is capable of adsorbing oil used to form said continuous oil phase. The method can further include mixing or circulating the diluted liquid and the adsorbent to obtain at least a continuous aqueous phase and the adsorbent. The method can also include separating at least the adsorbent from the continuous aqueous phase once the adsorbent has at least partially adsorbed the oil to obtain recovered brine in the absence of any oil phase.

For instance, the method can include diluting the invert emulsion with an aqueous liquid to obtain a diluted liquid. The diluted liquid can be composed of an aqueous phase co-existing with an oil phase. For example, the oil phase can be A) i) in the form of droplets on top of the aqueous phase, and/or ii) dispersed as droplets with a continuous aqueous component (like an oil-in-water emulsion), and/or B) separated (e.g., completely or substantially) in an aqueous phase and an oil phase. The method also includes adding at least one adsorbent, that is capable of adsorbing the oil used to form the continuous oil phase, to the invert emulsion or diluted liquid or any oil otherwise present in the invert emulsion or in the diluted liquid. The adsorbent can be added before, during, and/or after the diluting step. Alternatively, this step can involve contacting the invert emulsion or diluted liquid with at least one adsorbent before, during, and/or after the step of diluting. Then, the method includes mixing or circulating the diluted liquid and adsorbent to obtain at least a continuous aqueous phase and the adsorbent. The method then includes separating the adsorbent from the continuous aqueous phase once the adsorbent has at least partially adsorbed the oil (the oil that formed the continuous oil phase) to obtain recovered brine in the absence or substantial absence of any oil phase.

The present invention further relates to a method to separate an alkali metal formate brine that is present in an invert emulsion having a continuous oil phase, from the continuous oil phase involving the same steps as above.

In any of the methods, the method can further include increasing the density of the recovered brine, after it is separated from the adsorbent, for instance by heating or using other evaporation techniques.

The present invention also relates to a method to separate a brine that is present in an invert emulsion having a continuous oil phase. The method includes diluting the invert emulsion with an aqueous liquid to obtain a diluted liquid. The diluted liquid can be composed of an aqueous phase co-existing with an oil phase. As an example, the oil phase can be A) i) in the form of droplets on top of the aqueous phase, and/or ii) dispersed as droplets with a continuous aqueous component (like an oil-in-water emulsion), and/or B) separated (e.g., entirely and partially) in an aqueous phase and an oil phase. Then, the method includes mixing or circulating the diluted liquid. The method then includes separating an aqueous phase from the oil phase which is generally a lighter oil phase. This separating, for example, can involve using centrifugation and can result in the heavier aqueous phase to separate from the lighter oil phase. The aqueous phase can then be drained away or otherwise separated for instance using a funnel or the oil phase can be decanted. As an option, any residual oil left floating on the aqueous phase can be removed using an adsorbent and/or skimming techniques to remove the residual oil phase. The adsorbent can be particulate or in the form of a fabric or pad or fibers having an affinity for the oil. In a further method, the diluting step and use of an aqueous liquid can be omitted and the adsorbent can be circulated or mixed with the invert emulsion.

It is to be understood that both the foregoing general description and the following detailed description are exemplary and explanatory only and intended to provide a further explanation of the present invention, as claimed.

DETAILED DESCRIPTION OF THE PRESENT INVENTION

The present invention relates to methods to separate or recover a brine, such as an alkali metal formate brine, that is present in an invert emulsion having a continuous oil phase. More specifically, and just as an example, the present invention relates to methods to recover cesium formate or a brine comprising at least cesium formate that is present in an invert emulsion. The invert emulsion has a continuous oil phase (or external phase). The brine, such as the cesium formate or brine containing the cesium formate, is typically present as an internal phase (or non-continuous phase) which is dispersed in the continuous oil phase.

The invert emulsion can be an oil-based mud or drilling fluid or completion fluid, for instance, that has up to about 65 vol % aqueous phase of a brine in a continuous oil phase, wherein the volume percent is based on the total volume of the invert emulsion (e.g. from 1 vol % to 65 vol % non-continuous aqueous phase or from about 20 vol % to 60 vol %, or from about 30 vol % to 55 vol % non-continuous aqueous phase). The aqueous phase may even be present in higher amounts.

The external phase of the invert emulsion can comprise a base oil or other hydrocarbon fluids which impart similar properties in the drilling fluids. The hydrocarbon fluid can be, for example, an oleaginous base oil. Examples of the hydrocarbon fluids include, but are not limited to, diesel oil such as diesel oil number 2, mineral oils, crude oil, kerosene, as well as other conventional hydrocarbon fluids. Hydrocarbon fluids used in conventional oil based muds can be used as the external phase of the hydrocarbon drilling fluids of the present invention. Synthetic fluids, such as those used in conventional SBMs, also can be used as the external phase material of the invert emulsion. Conventional synthetic fluids which can be used include, for example, ethers, esters, olefin oligomers, or blends of these materials. The synthetic fluids can be, for example, (a) esters, which are synthetic oil soluble liquids made by the reaction of a fatty acid (e.g., a vegetable fatty acid) with an alcohol; (b) ethers and polyethers, such as a mono-ether, di-ether or mixture made by condensation and partial oxidation of alcohols; (c) paraffinic hydrocarbons, such as poly-alpha-olefins which are straight chain non-aromatic hydrocarbons which typically are made by polymerization of ethylene; (d) detergent alkylate which is also called a linear alkyl benzene, which is benzene to which a saturated hydrocarbon has been attached, and (e) mixtures of these synthetic hydrocarbon fluids. More specifically, the synthetic fluids can comprise, for example, synthetic oils (such as paraffin oils, olefin oils, vegetable oils, and the like). A non-limiting example of synthetic oil which can be used is IA-35 from Integrity Industries. These synthetic fluids are oil-soluble and normally highly lubricious and can have many of the characteristics of the indicated oils used in conventional OBMs. As will be apparent, this invention can be used in oil-based muds (OBM's) and muds having these synthetic bases (SBM's). Combinations of various oil based fluids or synthetic mud fluids also can be used for the hydrocarbon fluids forming the external phase of the invert emulsions treated in the present invention.

Thus, examples of the oil that forms the continuous oil phase include, but are not limited to, mineral oil, diesel oil, crude oil, synthetic oils, such as paraffin oils, olefin oils, vegetable oils, and the like. For purposes of the invention, an ester based fluid can be used as the external phase.

The invert emulsion can be one or more well construction and maintenance (repair) fluids, and for instance can be drilling fluids, completion fluids, workover fluids, fracturing fluids, packer fluids, and/or other fluids useful in drilling and/or well bore operations for hydrocarbon recovery (e.g., oil recovery, gas recovery). The invert emulsions can be used in well construction and maintenance operations where fluids are pumped into the well bore to provide well control, such as completion and workover operations. It is to be understood that "drilling fluids," as described herein, thus encompass, for purposes of the present invention, all types of fluids used in well bores and subterranean formations for the recovery of hydrocarbons, including, but not limited to, fluids used during the drilling stage (e.g., drilling fluids), completion fluids, workover fluids, fracturing fluids, packer fluids, and the like.

As indicated, the invert emulsion can be a drilling fluid, or a completion fluid, or a fluid used in a well bore, or any fluid used for any reason in hydrocarbon (e.g. oil and/or gas) recovery. The fluid can be a screen running fluid. It is to be understood that the descriptions herein for a drilling fluid can equally apply also to the components in a completion fluid or fluids used in completion operations for a well bore. For instance, the invert emulsion can be for completion of open hole completions where a sand screen is installed. The invert emulsion can be a low solids fluid, which are especially useful in completions of wells. The invert emulsions with low solids are also known as low solids oil-based muds or reduced solids oil-based muds or low solids oil-based completion fluids. There are at least two drivers for using low solids fluid (brine or oil based):

1) Well control. Running sand screens in a fluid with a heavy solids loading can be a problem due to sag. When the screen is being run there will be quite a long time when the fluid is not circulated and the solids might start sagging, and the fluid might not be able to compensate for the hydrostatic pressure higher up in the well.

2) Well clean-up. When the well is put on production, it is desirable to have the whole filtercake lift off and flow back through the screens. This is not happening in a fluid with solid weighting material. A large solids loading in the filtercake (also very thick filtercake when barite is involved) typically means that the screens are plugged when the well is put on production.

Another driver for using oil based rather than water based drilling and/or completion fluids is avoiding well bore instability. Oil based fluids are used many times rather than water based fluids because it is better able to stabilize the well bore (well bore instability in shale sections is known to be a problem for water based fluids). Also, it is desirable to complete a well with the same type of fluid used to drill the well. So, if the well was drilled with an oil based mud, many times it is preferred to complete the well with an oil based fluid.

As an option, the method to separate the brine that is present in an invert emulsion having a continuous oil phase includes, comprises, consists essentially of, or consists of:

a) combining the invert emulsion, an aqueous liquid, and at least one adsorbent together, in any sequence or order or number of steps, to obtain a diluted liquid with the adsorbent, wherein the at least one adsorbent is capable of adsorbing oil used to form the continuous oil phase;

b) mixing or circulating (or continuing to mix or circulate) the diluted liquid and the adsorbent to obtain at least a continuous aqueous phase and the adsorbent;

c) separating at least the adsorbent from the continuous aqueous phase once the adsorbent has at least partially adsorbed the oil to obtain recovered brine in the absence or substantial absence of any oil phase.

As options, in step a): the at least one adsorbent can be combined with the aqueous liquid and then the invert emulsion can be combined with the combined aqueous liquid and adsorbent, or in step a), the at least one adsorbent can be added to the aqueous liquid while mixing or circulating the aqueous liquid, and then afterwards the invert emulsion can be added or combined with the combined aqueous liquid and adsorbent, or in step a), the at least one adsorbent can be combined with the invert emulsion, and then afterwards, the aqueous liquid can be combined with the combined invert emulsion and adsorbent, or in step a), the at least one adsorbent, the aqueous liquid, and the invert emulsion can be combined together at the same time or about the same time (e.g., within 1 to 30 seconds), or in step a), the aqueous liquid can be combined with the invert emulsion and then afterwards, the at least one adsorbent can be added to the combined invert emulsion and aqueous liquid.

The more efficient and/or more effective methods are where the at least one adsorbent is added or combined with the aqueous liquid first, and then the invert emulsion is added (incrementally or in large batches or one batch) to the combined aqueous liquid and adsorbent. Preferably the amount of aqueous liquid is large compared to the amount of the invert emulsion, such as using the dilution rates described herein (e.g., volumes of 1:1 or greater, 2:1 or greater, or 3:1 or greater, or 4:1 or greater or 5:1 or greater (aq. liquid:invert emulsion)).

As an option, the dilution step and the use of an aqueous liquid can be omitted. In other words, the present invention also relates to a method to separate a brine that is present in an invert emulsion having a continuous oil phase, where the method comprises, consists essentially of, or consists of:

a) combining the invert emulsion and at least one adsorbent together, in any order, to obtain a liquid with the adsorbent, wherein the at least one adsorbent is capable of adsorbing oil used to form said continuous oil phase;

b) mixing or circulating the liquid and the adsorbent to obtain at least a continuous aqueous phase and the adsorbent;

c) separating at least said adsorbent from the continuous aqueous phase once the adsorbent has at least partially adsorbed the oil to obtain recovered brine in the absence of any oil phase.

In any of the methods of the present invention, the addition of any one (or more) ingredient(s) (e.g., the aqueous liquid and/or the adsorbent(s) and/or the invert emulsion) can be done incrementally or added slowly over time. In the alternative, the entire amount for any component/ingredient can be added all at the same time or about the same time (e.g., within 1 to 60 seconds or so). For instance, the adding of the invert emulsion to the aqueous liquid can be done incrementally, or added slowly over time (e.g., the addition, each time/stage of 1 vol % to 10 vol % of the total amount of the invert emulsion or any component can be added in stages over a time of from 30 seconds to 60 minutes or 2 or more hours). In the alternative, the entire invert emulsion to be processed can be added at the same time or about the same time (e.g., within 1 to 30 seconds or so).

For any of the methods of the present invention, any one or more of the components or ingredients can be mixed or circulated prior to being combined and/or while being combined with another component or ingredient. For instance, in step a), the aqueous liquid or the invert emulsion or both can be mixed or circulated prior to and/or when combined to form the diluted liquid.

As an option, the method to separate the brine that is present in an invert emulsion having a continuous oil phase includes, comprises, consists essentially of, or consists of:

(a) diluting the invert emulsion with an aqueous liquid to obtain a diluted liquid. For instance, the dilution is done with an aqueous liquid that is capable of forming a continuous aqueous phase when present in a sufficient volume. The diluted liquid once formed, can be composed of an aqueous phase co-existing with an oil phase. For instance, the oil phase can be A) i) in the form of droplets on top of the aqueous phase, and/or ii) dispersed as droplets with a continuous aqueous component (like an oil-in-water emulsion), and/or B) the components of the diluted liquid are completely or partially separated in an aqueous phase and an oil phase, (b) contacting the invert emulsion with at least one adsorbent that is capable of adsorbing oil used to form the continuous oil phase. The adsorbent is present before, during, and/or after the diluting step. This contacting of the invert emulsion or diluted liquid with at least one adsorbent can be achieved by adding at least one adsorbent to the invert emulsion (or vice versa) before diluting, during diluting, or after diluting, or any combination thereof, (c) mixing or circulating the diluted liquid and adsorbent to obtain at least a continuous aqueous phase and the adsorbent (as an option a residual amount of oil may be present that is not adsorbed), (d) separating the adsorbent (and optionally any residual amount of oil) from the continuous aqueous phase once the adsorbent has at least partially (and preferably almost completely or completely) adsorbed the oil to obtain recovered brine in the absence or substantial absence of any oil phase.

As an option, the method to separate the brine that is present in an invert emulsion having a continuous oil phase includes, comprises, consists essentially of, or consists of:

(a) combining at least one adsorbent that is capable of adsorbing oil used to form the continuous oil phase, with an aqueous liquid to obtain aqueous liquid and adsorbent, (b) combining the invert emulsion with the aqueous liquid and adsorbent (e.g. adding or mixing in the invert emulsion to the aqueous liquid and adsorbent). For instance, the aqueous liquid is capable of forming a continuous aqueous phase when present in a sufficient volume with the invert emulsion, and this combining of the invert emulsion with the aqueous liquid can be considered a diluted liquid. The diluted liquid once formed, can be composed of an aqueous phase co-existing with an oil phase, though the presence of the adsorbent will adsorb or otherwise remove at least a portion of the oil phase. The oil phase can be present as discontinuous regions in the aqueous phase, (c) optionally, mixing or circulating the diluted liquid and adsorbent to obtain at least a continuous aqueous phase and the adsorbent (as an option a residual amount of oil may be present that is not adsorbed), (d) separating the adsorbent (and optionally any residual amount of oil) from the continuous aqueous phase once the adsorbent has at least partially (and preferably almost completely or completely) adsorbed the oil to obtain recovered brine in the absence or substantial absence of any oil phase.

In the present invention, the brine can be any brine, for instance one typically used in drilling fluids or completion fluids or hydrocarbon recovery fluids. The brine can be one or more alkali metal salts, such as one or more alkali metal formates. The brine can be one or more alkali metal tungstates. Examples of brine include, but are not limited to, cesium salts, rubidium salts, potassium salts, lithium salts, sodium salts, calcium salts, and the like. More specific examples include, but are not limited to, cesium formate, sodium formate, rubidium formate, potassium formate, mixtures of cesium formate with potassium formate, cesium phosphate, rubidium phosphate, potassium phosphate, mixtures of cesium phosphate and potassium phosphate, cesium acetate, potassium acetate, mixtures of cesium acetate and potassium acetate, calcium bromide, calcium chloride, sodium bromide, zinc bromide, cesium tungstate, potassium tungstate, or any blends thereof. Blends of cesium salt(s) and rubidium salt(s) can be used. Blends of cesium salt(s), rubidium salt(s), and sodium salt(s) and/or potassium salt(s) can be used. For example, a blend of cesium phosphate, rubidium phosphate, and potassium phosphate can be used, or a blend of cesium acetate, rubidium acetate, and potassium acetate can be used. A blend of one or more acetates mentioned above with one or more formates mentioned above can be used. As an example, the brine can be present in an amount of from about 1 wt % to 85 wt % or more (5 wt % to 60 wt %, 10 wt % to 55 wt %, 20 wt % to 55 wt %, 30 wt % to 55 wt %, 40 wt % to 55 wt %) based on the total weight of the invert emulsion. These wt % can instead be vol % ranges, as an option. The brine can have any density or specific gravity, such as a specific gravity of from about 1 to 2.9 s.g. or higher such as 1.5 to 2.3 s.g. To be clear, s.g. (specific gravity), which is dimensionless, is the ratio of the density (at 1 atm and 15.6° C.) of a substance to the density (mass of the same unit volume) of a reference substance, which here is water. The s.g. numbers provided in the present invention can alternatively be density in $g/cm^3$ for purposes of the present invention.

The invert emulsion can be as described above in the background. The invert emulsion has at least one continuous oil phase with at least one aqueous internal phase. In other words, the aqueous phase is dispersed as a non-continuous phase (or an internal phase) in the invert emulsion. The invert emulsion can contain other components such as, but not limited to, one or more emulsifiers, one or more surfactants, one or more rheology modifying agents, one or more wetting agents, one or more weighting agents, and/or one or more fluid loss control agents, and/or other additives. For purposes of the present invention, the invert emulsion can be considered an oil-based mud or a synthetic based mud as long as there is at least one continuous oil phase and at least one non-continuous or internal aqueous phase.

With regard to the step of diluting the invert emulsion (if used) with an aqueous liquid, the aqueous liquid can be water, brine, or other aqueous liquids such as alcohols and the like. The water can be recycled water, such as water used to optionally wash the adsorbent. The aqueous liquid can optionally have the at least one adsorbent present in either or both of the invert emulsion and/or aqueous liquid prior to diluting. The diluting can occur in one stage or in multiple stages of additions of the aqueous liquid. If a brine is used for this purpose, the brine can be the same or different from the brine present in the invert emulsion. The diluting of the invert emulsion can be achieved by adding the aqueous liquid to the invert emulsion or vice versa. Generally, a sufficient amount (volume) of aqueous liquid is added to ultimately dilute the invert emulsion and lead to the formation of a continuous aqueous phase. Thus, the aqueous liquid preferably is added to the extent that the diluted invert emulsion is capable of forming and eventually forms a continuous aqueous phase at some point in the method. The diluting can be in an amount so as to achieve at least a one part aqueous to one part invert emulsion, by volume of the combined components. For instance, the diluting can be a range in an amount to achieve from about a two part aqueous to one part invert emulsion, by volume, to about a 50 part aqueous to one part invert emulsion (a range of from 2:1 to 50:1 or more), by volume where the volume is based on the components present. For instance, the diluting can be in an amount to achieve from about a five part aqueous to one part invert emulsion, by volume, to about a 30 part aqueous to one part invert emulsion (a range of from 5:1 to 30:1), by volume where the volume is based on the components present, or from about a two part aqueous to one part invert emulsion, by volume, to about a 30 part aqueous to one part invert emulsion (a range of from 2:1 to 30:1), by volume where the volume is based on the components present. The dilution amounts (volumes) can be even greater than these amounts.

With regard to the step of contacting the invert emulsion (and/or aqueous liquid) with at least one adsorbent, as stated above, this can be achieved by adding at least one adsorbent to the invert emulsion (and/or aqueous liquid) (or vice versa). The adsorbent can be in particulate form. Alternatively, the adsorbent can be in non-particulate form such as aggregates, blocks, fibers, briquettes, strips, plates, pads, and the like.

The adsorbent can be any adsorbent capable of adsorbing oil that is used to form the continuous oil phase of the invert emulsion. One suitable example of an adsorbent comprises, consists essentially of, consists of, or is activated carbon. The activated carbon can be powdered activated carbon and/or granular activated carbon. More specific examples of activated carbon that can be used include those from Cabot Norit Activated Carbon. More specific examples of activated carbons are Norit® W-52 activated carbon or Norit® W-90 activated carbon from Cabot Norit Activated Carbon.

As an example, the adsorbent can be added or present in an amount of at least 10 g per liter of invert emulsion (prior to diluting), or at least 50 g per liter, or at least 100 g per liter, or at least 125 g per liter, or at least 150 g per liter, or at least 200 g per liter, or at least 250 g per liter, or at least 300 g per liter, or at least 350 g per liter, or at least 400 g per liter, or at least 450 g per liter, or at least 500 g per liter, or at least 600 g per liter, or at least 700 g per liter, or at least 800 g per liter, or at least 1000 g per liter of invert emulsion (prior to any diluting). The amount of adsorbent can be from about 10 g per liter of invert emulsion to about 100 g per liter of invert emulsion, or from about 100 g per liter to about 450 g per liter of invert emulsion, or from about 100 g per liter to about 1000 g per liter of invert emulsion, or from about 200 g per liter to about 600 g per liter of invert emulsion, or from about 300 g per liter to about 900 g per liter of invert emulsion, or from about 500 g per liter to about 800 g per liter of invert emulsion. In lieu of 'g per liter of invert emulsion,' the amounts of adsorbent given here can instead be based on 'g per liter of aqueous liquid.'

As an option, the adsorbent can be present as a fixed bed or can be present as a fluidized bed.

The activated carbon can have a BET surface area of from about 500 to about 1500 $m^2/g$, or surfaces areas below this range or above this range. The activated carbon can generally have any pore volume typically present in activated carbons. The activated carbon can have a predominance of pores in the micropore range or can have predominance in the mesopore and/or macropore ranges. The activated carbon can be derived from coconut shell, wood based carbons, peat based carbons, coal, lignocellulosic materials, biomass, waste, tire, olive pits, peach pits, corn hulls, rice hulls, petroleum coke, lignite, brown coal, anthracite coal, bituminous coal, sub-bituminous coal, pecan shells, walnut shells, and the like.

With regard to any of the mixing or circulating step(s), the mixing or circulating can occur for any length of time for instance at least 5 seconds, at least 10 seconds, from 10 seconds to 30 minutes or more, at least 30 minutes, from 10 minutes to 90 minutes, from 10 minutes to 40 minutes, from 10 minutes to 24 hours or more such as for 48 hours or more, 72 hours or more and the like. The mixing or circulating can be achieved with any conventional mixer or blender. Ideally, the mixing or circulating does not damage the adsorbent if used in particulate or granular form. When adsorbent is present with the invert emulsion, the mixing or circulating achieves the interaction of the adsorbent with the diluted invert emulsion so as to achieve the adsorption of the oil that was forming the continuous oil phase.

With regard to the separating step which separates the adsorbent from the continuous aqueous phase, this separation can occur through any standard separation technique such as filtering or screens or centrifuging, or just settling. For instance, the filtering can be vacuum filtering or filtering with a cartridge filter. The manner in which the separation is achieved is not critical so long as the adsorbent (e.g., most or all of the adsorbent, over 95 wt % of adsorbent used) is separated from the continuous aqueous phase and at this point, the adsorbent would contain at least some, if not most or all of the oil that originally formed the continuous oil phase of the invert emulsion (e.g. from 75 wt % to 100 wt %, from 85 wt % to 100 wt %, from 90 wt % to 99.9 wt %, from 95 wt % to 99.5 wt %, from 98 wt % to 99.5 wt % of the oil originally present in the invert emulsion, based on the total weight of oil present in the invert emulsion). Any remaining un-adsorbed oil may form on top of the aqueous phase as droplets or regions or cakes that can be removed or skimmed away. As an option, the filtering, such as the vacuum filtering can be a rotary vacuum filter. As an option, the filtering can use a filter medium (e.g., filter cake). The filter medium can be any suitable filter medium, for instance, perlite or diatomaceous earth, and the like The filter medium can be used in the rotary vacuum filter.

As an option, after the invert emulsion is diluted and/or during the diluting, the method can optionally further include mixing at this stage so as to disperse the aqueous fluid into the invert emulsion (or vice versa). This additional mixing step can be helpful in obtaining the dispersion of the aqueous liquid into the invert emulsion to essentially cause a reversal of the invert emulsion (i.e., form a continuous aqueous phase). In other words, by adding sufficient amounts of the aqueous liquid and mixing, the invert emulsion can become an emulsion that now has a continuous aqueous phase and a non-continuous oil phase. With regard to this optional mixing step, any mixer can be used. The mixing technique and mixing time can be as above for the later mixing step once adsorbent is present.

As an option, after the separating step, the density of the recovered brine can be increased by reducing the water content (by weight) of the brine. For instance, the density can be increased by heating the recovered brine or using other standard or conventional evaporation techniques.

As an option, the oil containing adsorbent, once separated, can be washed, such as with a liquid (e.g., aqueous liquid). The liquid used to wash the used adsorbent can be a) evaporated or otherwise removed, to recover more brine, b) recycled or used again in a subsequent method (for instance in a batch process), or c) fed back into a continuous process before or after the adsorbent and emulsion are mixed when a continuous process is used.

As an option, the brine, either before or after any evaporation step to concentrate the brine, can be subjected to a precipitation step(s). The precipitation step(s) can remove calcium and/or other multivalent cations that may be present in the brine. The adsorbent, such as activated carbon, can contain calcium, and so it can be preferred to remove the calcium and/or other alkaline earth metal to lower levels (e.g., reduce to levels of 100 mg/L (mg calcium per liter of brine) or lower, from 0 mg/L to 75 mg/L, from 5 mg/L to 50 mg/L and the like). This precipitation step can be done by adding bicarbonate salt (e.g., potassium bicarbonate) and/or carbonate salt (potassium carbonate) and/or other precipitating reagent (e.g., other salts such as phosphates or other Group IA metal salts). The brine during this optional step can be stirred or mixed (prior and/or during). The bicarbonate and/or carbonate and/or other precipitating reagent is added in sufficient amounts to achieve precipitation to achieve levels of calcium and/or other alkaline metals concentrations mentioned above. If mixing or stirring is used, the mixing or stirring can occur for any time from 1 minute to 72 hours or more and any time in between as mentioned earlier for any mixing step(s) of the present invention.

As an option, after the precipitation step or even if one is not used, the brine (whether diluted or concentrated) can be subjected to a filtering step, such as a plate filter or cylindrical filter, for instance to separate the precipitate (e.g. $CaCO_3$) from the brine. The filter can be one or more stages using the same or multiple pore sizes (e.g., 0.5, 1, 2, 5, 10, 15, 20 micron size filters).

As an option, the concentrated brine, after the evaporation step, can be subjected to a polishing step which can use a plate filter(s) or cylindrical filter(s) and the like. The filter can be one or more stages using the same or multiple pore sizes (e.g., 0.5, 1, 2, 5, 10, 15, or 20 micron size filters). Any one or more of the optional steps can be used in various combinations.

As a further option, at any point in the methods, the pH of the brine can be raised for instance by 1, 2, or 3 or more pH units for instance to achieve a pH of from 12 to 14 for at least a period of time. By raising the pH, this has the ability to further remove other components originally present in the invert emulsion, such as one or more wetting agents, emulsifiers, and/or surfactants. These types of components can be removed by raising the pH to high levels which can cause these ingredients to precipitate out and then these can be removed by standard filtration or other removal techniques. Raising pH can simultaneously remove unwanted contaminants from the aqueous phase, such as for example multivalent cations.

The present invention also relates to a method to separate a brine that is present in an invert emulsion having a continuous oil phase. The method includes diluting the invert emulsion with an aqueous liquid to obtain a diluted liquid. The diluted liquid can be composed of an aqueous phase co-existing with an oil phase. For instance, the oil phase can be A) i) in the form of droplets on top of the aqueous phase, and/or ii) dispersed as droplets with a continuous aqueous component (like an oil-in-water emulsion), and/or B) separated (e.g., entirely and partially) in an aqueous phase and an oil phase. Then, the method includes mixing or circulating the diluted liquid. The method then includes separating an aqueous phase from the oil phase. The oil phase can be and generally is a lighter phase, than the aqueous phase. This separating, for example, can comprise gravitational setting or accelerated gravitational settling (e.g., using a centrifuge). This separating can result in an heavier aqueous phase to separate from the lighter oil phase (e.g., as layers). The aqueous phase can then be drained away or otherwise separated for instance using a funnel or the oil phase can be decanted. As an option, any residual oil left floating on the aqueous phase can be removed using an adsorbent, filter, and/or skimming techniques to remove the residual oil phase. The adsorbent used for this optional step can be particulate or in the form of a fabric or pad or fibers having an affinity for the oil, or can be any of the adsorbents described earlier.

For purposes of the present invention, it is to be understood that "in the absence of any oil phase" (once the adsorbent is separated from the continuous aqueous phase) is meant to mean in the complete absence of any oil phase or in the substantial absence of any oil phase such that the continuous aqueous phase or brine that is recovered has less than 5 wt % oil, less than 3 wt % oil, less than 1 wt % oil, less than 0.5 wt % oil, less than 0.25 wt % oil, less than 0.1 wt % oil, such as from 0.0 wt % to less than 5 wt % or from 0.001 wt % to 1 wt % oil, based on the total weight of the recovered brine.

The present invention will be further clarified by the following examples, which are intended to be exemplary of the present invention.

EXAMPLES

Examples 1-7

In these examples, a low solids oil-based mud (LS OBM) was used. The low solids oil-based mud was a mineral oil containing a cesium formate invert phase. This oil-based mud was a 50 wt % oil with a 50 wt % invert aqueous phase of 2.20 g/cm³ cesium formate brine. In these experiments, the activated carbon (Norit® W 52 activated carbon, Cabot Corporation) was first added to the dilution water. Various volumes of the dilution water was then mixed with the oil-based mud. The proportions of LS OBM, W52 activated carbon, and water are shown in Table 1. Then, the components were mixed for one hour. Then, the components were filtered using an API filter press. The API filter had a pore size of 8 microns. Then the recovered brine was heated in order to evaporate water so as to increase the density of the recovered cesium formate brine.

As can be seen in the Table below, the recoveries of the cesium formate brine were 80% or higher and as can be seen in the Table, higher amounts of dilution water per liter of oil-based mud provided a higher percent of recovery for the cesium formate brine. For all examples, the recovery % (based on volume) of brine originally present in the oil based mud is calculated by taking into account the density of fluid after dilution and the known amount of water that is added during dilution. The % recovery was also determined based on number of cesium formate moles recovered relative to number of moles of the formate brine in the starting invert emulsion. With % recovery based on volume, as indicated, the Recovery % is % volume of brine recovered having same density as the starting brine. For instance, if there was 100 ml of 2.20 g/cm³ formate brine in the invert emulsion, and the equivalent of 86 ml of 2.20 g/cm³ formate brine was recovered, this would give a percent brine recovery of 86%.

Also, for all examples, dilution amount (x) is by volume.

TABLE 1

| Test | Amount of LSOBM used (mL) | Dilution Factor By vol. | Amount of W-52 (g per litre LS OBM) | Volume obtained (mL) | Recovery (%) | Time of filtration (API) |
|---|---|---|---|---|---|---|
| 1 | 100 | 5 | 360 | 53 | 90 | 5 min |
| 2 | 100 | 3 | 420 | 81 | 92 | 5 min |
| 3 | 100 | 3 | 520 | 47 | 86 | 5 min |
| 4 | 100 | 2 | 520 | 40 | 84 | 5 min |
| 5 | 100 | 2 | 520 | 52 | 84 | 5 min |
| 6 | 100 | 1 | 520 | 30 | 80 | 5 min |
| 7 | 100 | 1 | 520 | 51 | 80 | 5 min |

Examples 8 and 9

Further experiments were done on a larger scale with respect to the oil-based mud. In Examples 8 and 9, the oil-based mud was the same as in Examples 1-7 except larger amounts were used as shown in Table 2 below The same steps as set forth in Examples 1-7 were followed and an API filter press was used. The API filter had a pore size of 8 microns. As shown in Table 2, an oily filter cake also formed which was a result of using too little activated carbon. As can be seen in Table 2, the % recovery amount of cesium formate brine was over 80% based on the starting volume of the cesium formate present.

TABLE 2

| Examples | LSOBM volume (ml) | Dilution (x) | Amount W-52 (g/litre LSOBM) | Filtration Rate | Oily Filter cake | Recovery (% by vol) |
|---|---|---|---|---|---|---|
| 8 | 500 | 4 | 250 | Slower | More | 86 |
| 9 | 250 | 5 | 360 | Faster | Less | 84 |

*Samples were filtered through 8 μm API filter press.

Example 10

In this example, the use of activated carbon was not part of the process. The same oil-based mud as used in Example 1 was diluted (5×) with water and then mixed well as in Example 1 and then subjected to centrifugation where the centrifuge was operated at 4,000 RPM for one hour. The separated aqueous phase was then filtered through an API filter press and evaporated to higher densities.

The recovery rate was approximately 34% based on the starting weight of the formate brine and the recovered formate brine. While this method was useful in recovering the brine, the use of activated carbon permitted higher recovery rates. Other adsorbents that are also capable of adsorbing oil would also be considered as effective as activated carbon.

Examples 11 and 12

In these examples, the time that the activated carbon was in contact with the diluted liquid was varied. In these examples, essentially Example 1 was repeated, wherein 100 mL of low solids oil-based mud was used with a dilution of 500 mL of water (a 5×) dilution and 300 g of activated carbon (Norit® W 52 activated carbon, Cabot Corporation) was used per liter of oil-based mud. In Example 11, the contact time was 30 minutes and in Example 12, the contact time was 60 minutes. For Example 11, the brine recovery rate was 85% and for Example 12, the brine recovery rate was 88.3% thus showing that a longer contact time can assist slightly in increasing the brine recovery rate, though these recovery amounts were close enough to be considered within experimental error.

Example 13

In this example, a commercially available used oil-based mud was obtained which contained a blended cesium formate and potassium formate with a density of 2.0 g/cm³ as an invert phase along with water, brine, surfactants, and other components. It was estimated that this oil-based mud contained roughly 30 wt % solids. It is believed that this oil-based mud was a 50/50 (by vol) oil to water emulsion. In this example, the same process as in Example 1 was followed except for the oil-based mud used. The dilution amount was 5× (by vol) and the amount of adsorbent used (Norit® W 52 activated carbon, Cabot Corporation) was 360 g per liter of oil-based mud.

The percent brine recovery in volume was 83% which was considered quite effective with regard to the abilities of the methods of the present invention.

Example 14

Example 1 was repeated except the LS OBM had cesium phosphate as the internal phase. This LS OBM consisted of 50 vol % brine and 50 vol % oil. The brine had a density of 2.42 g/cm$^3$. The treatment was a dilution 5 parts (by vol) water, and using 360 g activated carbon (Norit® W 52 activated carbon, Cabot Corporation) per liter of LS OBM. This filtered extremely well to produce a clean fluid with barely any surfactant type phase or regions even after heating. The % brine recovery was 93%.

Example 15

In this example, a commercial low solids oil-based mud (LS OBM) was used. The low solids oil-based mud was a mineral oil containing a cesium formate invert phase. This oil-based mud was a 50 wt % oil with a 50 wt % invert aqueous phase of 2.10 g/cm$^3$ cesium formate brine. In this experiment, 100 ml LS OBM was added to 250 ml of water and 50 g activated carbon (Norit® W 52 activated carbon, Cabot Corporation). Then, the components were mixed for 90 minutes. Then, the components were filtered using an API filter press. The API filter had a pore size of 8 microns. This resulted in a brine recovery of 77%. Then, 100 ml of water was added to the filter cake resulting from the API filter press and left sitting for 14 hours. Then, afterwards, the water plus filter cake was filtered through a 2.7 micron filter paper, and an additional % brine recover of 11% occurred. Thus, the total % brine recovery was 88%.

Example 16

In this example, a commercially available low solids oil-based mud (LS OBM) was used from the field having a specific gravity of 1.49 s.g. The low solids oil-based mud was an oil containing a cesium formate invert phase. This oil-based mud was about a 60 wt % oil with a 40 wt % invert aqueous phase of about 2.10 g/cm$^3$ cesium formate brine. 1800 kg of activated carbon (Norit® W 52 activated carbon, Cabot Corporation) was added to a mixing tank containing water (4 m$^3$ of water). The water was stirred during this time. A portion of this mixture was pumped to a second mixing tank (2.9 m$^3$ of activated carbon slurry). This mixing tank had additional water present in it, namely 2.1 m$^3$ of additional water, prior to the pumping of the activated carbon slurry. At this point, the second mixing tank had about 1050 kg of activated carbon and 4.5 m$^3$ of water. The slurry mixture in the second mixing tank was stirred for approximately 90 minutes. A sample was obtained to determine if any free oil was present in the slurry, as opposed to being adsorbed onto the activated carbon. Then, a rotary vacuum filter was prepared with a filter medium (in this case, perlite medium, but any filter media can be used, like diatomaceous earth and the like). Then the slurry mixture was transferred to the rotary vacuum filter and the filtering was commenced for about 2 to 3 hours. The slurry mixture was stirred during the transfer to the filter. This resulted in separated diluted cesium formate from the activated carbon/mud slurry. The diluted brine at this point had a density of about 1.114 g/cm$^3$. The above steps were repeated multiple times as batch runs, until approximately 39.5 m$^3$ of diluted brine was recovered. The diluted brine was then transferred to a further mixing tank and potassium bicarbonate was added to precipitate out at least a portion of calcium that was present. The activated carbon used in this process can have calcium present for instance, 1.5 wt % Ca can be present in the activated carbon (based on total weight of activated carbon). It was estimated here that about 500 mg/L of calcium was present in the diluted brine. 1.26 kg/m$^3$ of potassium bicarbonate were added to the diluted brine and the overall mixture was mixed for about 24 hours to form the calcium carbonate precipitate. Then, the diluted brine with calcium precipitate was filtered using 10 micron and then 0.5 micron filter pads. The resulting clear diluted brine had approximately 40 mg/L of calcium, and was then transferred to an evaporator to boil off (evaporate) the water. This evaporation step was repeated, and each time, the concentrated brine from the previous evaporation was left in the evaporator. After the evaporation step, the brine was concentrated, and had a density of at least 1.638 g/cm$^3$ (at 15.6 deg C.). 7.7 m$^3$ of concentrated brine was recovered.

Then, the above steps, starting with a further batch of LS OBM and addition of activated carbon and ending with separating out the activated carbon, were repeated to obtain an additional 22.8 m$^3$ of diluted brine. Potassium bicarbonate, to this second batch, was added in an amount of 2.19 kg/m$^3$ and stirred for 24 hours. Then, the diluted brine with calcium precipitate was filtered using 10 micron and then 0.5 micron filter pads. In the same manner as the first batch, the filtered diluted brine was then transferred to an evaporator to boil off (evaporate) the water. This evaporation step was repeated, and each time, the concentrated brine from the previous evaporation was left in the evaporator. After the evaporation step, the brine was concentrated, and had a density of at least 1.334 g/cm$^3$ (at 15.6 deg C.). 8.8 m$^3$ of concentrated brine was recovered. Then, the volumes of the first batch (7.7 m$^3$) and the second batch (8.8 m$^3$) of the concentrated brine were combined in an evaporator and further evaporation was conducted (boiled back) to obtain an overall volume of 7.8 m$^3$ of highly concentrated brine having a 1.993 s.g. (or g/cm$^3$).

Afterwards, though optional, a polishing step was carried out, where the highly concentrated brine was passed through a 2 micron filter pad (though any size can be used, e.g., from 0.5 micron to 20 microns or higher). Total recovery was calculated to be about 85.4 wt % of available brine at the start of the process.

The present invention includes the following aspects/embodiments/features in any order and/or in any combination:

1. A method to separate a brine that is present in an invert emulsion having a continuous oil phase, said method comprising
   a) combining said invert emulsion, an aqueous liquid, and at least one adsorbent together, in any order, to obtain a diluted liquid with said adsorbent, wherein said at least one adsorbent is capable of adsorbing oil used to form said continuous oil phase;
   b) mixing or circulating said diluted liquid and said adsorbent to obtain at least a continuous aqueous phase and said adsorbent;
   c) separating at least said adsorbent from said continuous aqueous phase once said adsorbent has at least partially adsorbed said oil to obtain recovered brine in the absence of any oil phase.

2. The method of any preceding or following embodiment/feature/aspect, wherein in step a), said at least one adsorbent is combined with said aqueous liquid and then said invert emulsion is combined with said aqueous liquid.

3. The method of any preceding or following embodiment/feature/aspect, wherein in step a), said at least one adsorbent is added to said aqueous liquid while mixing or circulating said aqueous liquid, and then adding said invert emulsion to said aqueous liquid.

4. The method of any preceding or following embodiment/feature/aspect, wherein said adding of said invert emulsion is done incrementally.

5. The method of any preceding or following embodiment/feature/aspect, wherein in step a), said at least one adsorbent is combined with said invert emulsion and then said aqueous liquid is combined with said invert emulsion.

6. The method of any preceding or following embodiment/feature/aspect, wherein in step a), said at least one adsorbent, said aqueous liquid, and said invert emulsion are combined together at about the same time.

7. The method of any preceding or following embodiment/feature/aspect, wherein in step a), said aqueous liquid or said invert emulsion or both are being mixed or circulated when combined to form said diluted liquid.

8. The method of any preceding or following embodiment/feature/aspect, wherein in step a), said aqueous liquid is combined with said invert emulsion and then said at least one adsorbent is added to said combined invert emulsion and aqueous liquid.

9. A method to separate a brine that is present in an invert emulsion having a continuous oil phase, said method comprising
   a) diluting said invert emulsion with an aqueous liquid to obtain a diluted liquid;
   b) adding at least one adsorbent that is capable of adsorbing oil used to form said continuous oil phase, wherein said adsorbent is added before, during or after step a);
   c) mixing or circulating said diluted liquid and said adsorbent to obtain at least a continuous aqueous phase and said adsorbent;
   d) separating at least said adsorbent from said continuous aqueous phase once said adsorbent has at least partially adsorbed said oil to obtain recovered brine in the absence of any oil phase.

10. The method of any preceding or following embodiment/feature/aspect, wherein said brine comprises an alkali metal salt.

11. The method of any preceding or following embodiment/feature/aspect, wherein said brine comprises a cesium containing brine.

12. The method of any preceding or following embodiment/feature/aspect, wherein said brine comprises cesium formate.

13. The method of any preceding or following embodiment/feature/aspect, wherein said brine comprises cesium formate, rubidium formate, or potassium formate, or any combination thereof.

14. The method of any preceding or following embodiment/feature/aspect, wherein said brine comprises at potassium formate, sodium formate, cesium formate, rubidium formate, cesium phosphate, rubidium phosphate, potassium phosphate, cesium acetate, rubidium acetate, potassium acetate, calcium bromide, calcium chloride, sodium bromide, or zinc bromide, or any blends thereof.

15. The method of any preceding or following embodiment/feature/aspect, further comprising increasing the density of said recovered brine.

16. The method of any preceding or following embodiment/feature/aspect, wherein said aqueous liquid is water.

17. The method of any preceding or following embodiment/feature/aspect, wherein said diluting is in an amount to achieve at least a 1 part aqueous to 1 part invert emulsion, by volume.

18. The method of any preceding or following embodiment/feature/aspect, wherein said diluting is in an amount to achieve from about a 1 part aqueous to 1 part invert emulsion, by volume to about a 50 part aqueous to 1 part invert emulsion, by volume.

19. The method of any preceding or following embodiment/feature/aspect, wherein said adsorbent is in particulate form.

20. The method of any preceding or following embodiment/feature/aspect, wherein said adsorbent comprises activated carbon.

21. The method of any preceding or following embodiment/feature/aspect, wherein said diluted liquid comprises an aqueous phase co-existing with an oil phase, where the oil phase is A) i) in the form of droplets on top of the aqueous phase, and/or ii) dispersed as droplets with a continuous aqueous component, and/or B) separated in an aqueous phase and an oil phase.

22. The method of any preceding or following embodiment/feature/aspect, wherein said adsorbent is added after step a).

23. The method of any preceding or following embodiment/feature/aspect, wherein said mixing or circulating occurs for at least 30 minutes.

24. The method of any preceding or following embodiment/feature/aspect, wherein said mixing or circulating occurs for from about 10 minutes to about 72 hours.

25. The method of any preceding or following embodiment/feature/aspect, wherein said separating comprises filtering.

26. The method of any preceding or following embodiment/feature/aspect, wherein said separating occurs once said adsorbent has substantially adsorbed said oil.

27. The method of any preceding or following embodiment/feature/aspect, wherein said brine is a formate brine.

28. The method of any preceding or following embodiment/feature/aspect, wherein during said diluting or after said diluting, or both, said method further comprising mixing so as to disperse said aqueous liquid in said invert emulsion.

29. The method of any preceding or following embodiment/feature/aspect, wherein after said diluting, said mixing is continued until said oil is dispersed in said aqueous liquid to form an aqueous emulsion or continuous aqueous phase.

30. The method of any preceding or following embodiment/feature/aspect, wherein said increasing density comprises evaporating a portion of said aqueous liquid from said recovered formate brine.

31. The method of any preceding or following embodiment/feature/aspect, wherein said invert emulsion comprises an oil based mud or drilling fluid that has up to about 65% by vol aqueous phase of said alkali metal formate in a continuous oil phase, wherein said vol % is based on total volume of said invert emulsion.

32. The method of any preceding or following embodiment/feature/aspect, wherein said oil in said invert emulsion comprises mineral oil.

33. The method of any preceding or following embodiment/feature/aspect, said method further comprising raising the pH of said recovered formate brine to a pH of from 12 to 14 for at least a period of time.

34. The method of any preceding or following embodiment/feature/aspect, wherein said activated carbon is powdered.

35. The method of any preceding or following embodiment/feature/aspect, wherein said activated carbon is granular.

36. The method of any preceding or following embodiment/feature/aspect, wherein said invert emulsion is a completion fluid.

37. The method of any preceding or following embodiment/feature/aspect, wherein said invert emulsion is a fluid utilized for recovery of hydrocarbons in subterranean formations.

38. The method of any preceding or following embodiment/feature/aspect, wherein said invert emulsion is a well bore fluid.

39. The method of any preceding or following embodiment/feature/aspect, wherein said adsorbent is in the form of fibers, one or more pads, fabric(s), filter(s), blocks, briquettes, or any combinations thereof.

40. A method to separate a brine that is present in an invert emulsion having a continuous oil phase, said method comprising
a) diluting said invert emulsion with an aqueous liquid to obtain a diluted liquid;
b) mixing or circulating said diluted liquid and said adsorbent to obtain at least a continuous aqueous phase and an oil phase;
c) separating at least said continuous aqueous phase from said oil phase to obtain recovered brine.

41. The method of any preceding or following embodiment/feature/aspect, wherein said brine comprises an alkali metal salt.

42. The method of any preceding or following embodiment/feature/aspect, wherein said brine comprises a cesium containing brine.

43. The method of any preceding or following embodiment/feature/aspect, wherein said brine comprises cesium formate.

44. The method of any preceding or following embodiment/feature/aspect, wherein said brine comprises cesium formate, rubidium formate, potassium formate, or any combination thereof.

45. The method of any preceding or following embodiment/feature/aspect, wherein said brine comprises at potassium formate, cesium formate, rubidium formate, cesium phosphate, rubidium phosphate, potassium phosphate, cesium acetate, rubidium acetate, potassium acetate, calcium bromide, calcium chloride, sodium bromide, or zinc bromide, or any blends thereof.

46. The method of any preceding or following embodiment/feature/aspect, wherein said separating comprises gravitational setting or accelerated gravitational settling.

47. The method of any preceding or following embodiment/feature/aspect, further comprising contacting said recovered brine with at least one adsorbent to remove at least a portion of any residual oil present in the recovered brine.

48. The method of any preceding or following embodiment/feature/aspect, further comprising removing at least a portion of any residual oil present in the recovered brine by skimming, filtering, or any combination thereof.

49. The method of any preceding or following embodiment/feature/aspect, wherein said diluted liquid comprises an aqueous phase co-existing with an oil phase, where the oil phase is A) i) in the form of droplets on top of the aqueous phase, and/or ii) dispersed as droplets with a continuous aqueous component, and/or B) separated in an aqueous phase and an oil phase.

50. A method to separate a brine that is present in an invert emulsion having a continuous oil phase, said method comprising
a) combining said invert emulsion and at least one adsorbent together, in any order, to obtain a liquid with said adsorbent, wherein said at least one adsorbent is capable of adsorbing oil used to form said continuous oil phase;
b) mixing or circulating said liquid and said adsorbent to obtain at least a continuous aqueous phase and said adsorbent;
c) separating at least said adsorbent from said continuous aqueous phase once said adsorbent has at least partially adsorbed said oil to obtain recovered brine in the absence of any oil phase.

51. The method of any preceding or following embodiment/feature/aspect, further comprising washing said adsorbent from step c) with a liquid.

52. The method of any preceding or following embodiment/feature/aspect, further comprising washing said adsorbent from step c) with a wash liquid to obtain a washed adsorbent, and i) evaporating said wash liquid to recover more brine, or ii) repeating said method and re-introducing said washed adsorbent in said method in step a), or both i) and ii).

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:
1. A method to separate a brine that is present in an invert emulsion having a continuous oil phase, wherein said invert emulsion is a used invert emulsion and recovered from drilling and/or well bore operations for hydrocarbon recovery, said method comprising
a) combining said invert emulsion, an aqueous liquid, and at least one adsorbent together, in any order, to obtain a diluted liquid with said at least one adsorbent, wherein said at least one adsorbent is capable of adsorbing oil used to form said continuous oil phase and said adsorbent is present in an amount of at least 10 grams per liter of said invert emulsion;
b) mixing or circulating said diluted liquid and said at least one adsorbent to obtain at least a continuous aqueous phase and said at least one adsorbent;
c) separating at least said at least one adsorbent from said continuous aqueous phase once said at least one adsorbent has substantially adsorbed said oil to obtain recovered brine in the absence of any oil phase.

2. The method of claim 1, wherein in step a), said at least one adsorbent is combined with said aqueous liquid first, and then said invert emulsion is combined with said aqueous liquid.

3. The method of claim 1, wherein in step a), said at least one adsorbent is added to said aqueous liquid first, while mixing or circulating said aqueous liquid, and then adding said invert emulsion to said aqueous liquid.

4. The method of claim 3, wherein said adding of said invert emulsion is done incrementally.

5. The method of claim 1, wherein in step a), said at least one adsorbent is combined with said invert emulsion and then said aqueous liquid is combined with said invert emulsion.

6. The method of claim 1, wherein in step a), said at least one adsorbent, said aqueous liquid, and said invert emulsion are combined together at about the same time.

7. The method of claim 1, wherein in step a), said aqueous liquid or said invert emulsion or both are being mixed or circulated when combined to form said diluted liquid.

8. The method of claim 1, wherein in step a), said aqueous liquid is combined with said invert emulsion and then said at least one adsorbent is added to said combined invert emulsion and aqueous liquid.

9. The method of claim 1, said method comprising
in step a) diluting said invert emulsion with said aqueous liquid to obtain said diluted liquid
and wherein said at least one adsorbent is added before, during or after said diluting of said invert emulsion with said aqueous liquid.

10. The method of claim 1, wherein said brine comprises an alkali metal salt.

11. The method of claim 1, wherein said brine comprises a cesium containing brine.

12. The method of claim 1, wherein said brine comprises cesium formate.

13. The method of claim 1, wherein said brine comprises cesium formate, rubidium formate, potassium formate, or any combination thereof.

14. The method of claim 1, wherein said brine comprises potassium formate, cesium formate, sodium formate, rubidium formate, cesium phosphate, rubidium phosphate, potassium phosphate, cesium acetate, rubidium acetate, potassium acetate, calcium bromide, calcium chloride, sodium bromide, or zinc bromide, or any blends thereof.

15. The method of claim 1, further comprising increasing the density of said recovered brine.

16. The method of claim 1, wherein said aqueous liquid is water.

17. The method of claim 1, wherein said aqueous liquid is present in an amount to achieve at least a 1 part aqueous liquid to 1 part invert emulsion, by volume.

18. The method of claim 1, wherein said aqueous liquid is present in an amount to achieve from about 1 part aqueous liquid to 1 part invert emulsion, by volume to about a 50 part aqueous liquid to 1 part invert emulsion, by volume.

19. The method of claim 1, wherein said at least one adsorbent is in particulate form.

20. The method of claim 1, wherein said at least one adsorbent comprises activated carbon.

21. The method of claim 1, wherein said diluted liquid comprises an aqueous phase co-existing with an oil phase, where the oil phase is A) i) in the form of droplets on top of the aqueous phase, and/or ii) dispersed as droplets with a continuous aqueous component, and/or B) separated in an aqueous phase and an oil phase.

22. The method of claim 9, wherein said at least one adsorbent is added in step a) after said diluting of said invert emulsion with said aqueous liquid.

23. The method of claim 1, wherein said mixing or circulating occurs for at least 30 minutes.

24. The method of claim 1, wherein said mixing or circulating occurs for from about 10 minutes to about 72 hours.

25. The method of claim 1, wherein said separating comprises filtering.

26. The method of claim 1, wherein said brine is a formate brine.

27. The method of claim 1, wherein during said diluting or after said diluting, or both, said method further comprising mixing so as to disperse said aqueous liquid in said invert emulsion.

28. The method of claim 27, wherein after said diluting, said mixing is continued until said oil is dispersed in said aqueous liquid to form an aqueous emulsion or continuous aqueous phase.

29. The method of claim 15, wherein said increasing the density comprises evaporating a portion of said aqueous liquid from said recovered brine.

30. The method of claim 10, wherein said invert emulsion comprises an oil based mud or drilling fluid that has up to about 65% by vol aqueous phase of said alkali metal salt in a continuous oil phase, wherein said vol % is based on total volume of said invert emulsion.

31. The method of claim 1, wherein said oil in said invert emulsion comprises mineral oil.

32. The method of claim 1, said method further comprising raising the pH of said recovered brine to a pH within a range of 12 to 14 for at least a period of time.

33. The method of claim 20, wherein said activated carbon is powdered.

34. The method of claim 20, wherein said activated carbon is granular.

35. The method of claim 1, wherein said invert emulsion is a completion fluid.

36. The method of claim 1, wherein said invert emulsion is a fluid utilized for recovery of hydrocarbons in subterranean formations.

37. The method of claim 1, wherein said invert emulsion is a well bore fluid.

38. The method of claim 1, wherein said at least one adsorbent is in the form of fibers, one or more pads, fabric(s), filter(s), blocks, briquettes, or any combinations thereof.

39. A method to separate a brine that is present in an invert emulsion having a continuous oil phase, wherein said invert emulsion is a used invert emulsion and recovered from drilling and/or well bore operations for hydrocarbon recovery, said method comprising
a) diluting said invert emulsion with an aqueous liquid to obtain a diluted liquid;
b) mixing or circulating said diluted liquid so that said invert emulsion becomes an emulsion comprising at least a continuous aqueous phase and a non-continuous oil phase;
c) separating at least said continuous aqueous phase from said oil phase to obtain recovered brine.

40. The method of claim 39, wherein said brine comprises an alkali metal salt.

41. The method of claim 39, wherein said brine comprises a cesium-containing brine.

42. The method of claim 39, wherein said brine comprises cesium formate, rubidium formate, potassium formate, or any blends thereof.

43. The method of claim 39, wherein said brine comprises potassium formate, cesium formate, rubidium formate, sodium formate, cesium phosphate, rubidium phosphate, potassium phosphate, cesium acetate, rubidium acetate, potassium acetate, calcium bromide, calcium chloride, sodium bromide, or zinc bromide, or any blends thereof.

44. The method of claim 39, wherein said separating comprises gravitational setting or accelerated gravitational settling.

45. The method of claim 39, further comprising contacting said recovered brine with at least one adsorbent to remove at least a portion of any residual oil present in the recovered brine.

46. The method of claim 39, further comprising removing at least a portion of any residual oil present in the recovered brine by skimming, filtering, or any combination thereof.

47. The method of claim 39, wherein said diluted liquid comprises an aqueous phase co-existing with an oil phase, where the oil phase is A) i) in the form of droplets on top of the aqueous phase, and/or ii) dispersed as droplets with a continuous aqueous component, and/or B) separated in an aqueous phase and an oil phase.

48. A method to separate a brine that is present in an invert emulsion having a continuous oil phase, said method comprising
  a) combining said invert emulsion and at least one adsorbent together, in any order, to obtain a liquid with said at least one adsorbent, wherein said at least one adsorbent is capable of adsorbing oil used to form said continuous oil phase, and wherein said at least one adsorbent comprises activated carbon;
  b) mixing or circulating said liquid and said at least one adsorbent to obtain at least a continuous aqueous phase and said at least one adsorbent;
  c) separating at least said at least one adsorbent from said continuous aqueous phase once said at least one adsorbent has substantially adsorbed said oil to obtain recovered brine in the absence of any oil phase.

49. The method of claim 1, further comprising washing said at least one adsorbent from step c) with a liquid.

50. The method of claim 1, further comprising washing said at least one adsorbent from step c) with a wash liquid to obtain a washed adsorbent, and i) evaporating said wash liquid to recover more brine, or ii) repeating said method and re-introducing said washed adsorbent in said method in step a), or both i) and ii).

51. The method of claim 1 wherein the brine is present in the invert emulsion in an amount of from 5 wt % to 85 wt %, based on total weight of the invert emulsion, wherein the brine has a specific gravity of from 1.5 to 2.9.

52. The method of claim 1, wherein said adsorbent is present in an amount of at least 100 g per liter of said invert emulsion.

53. The method of claim 1, wherein said adsorbent is present in an amount of at least 1000 g per liter of said invert emulsion.

54. The method of claim 1, wherein said adsorbent adsorbs from about 75 wt % to 100 wt % of said oil originally present in said invert emulsion.

* * * * *